(12) United States Patent
Smith (10) Patent No.: US 9,771,787 B2
(45) Date of Patent: *Sep. 26, 2017

(54) MULTI-DIRECTIONALLY ROTATING DOWNHOLE DRILLING ASSEMBLY AND METHOD

(71) Applicant: Gary Smith, Houston, TX (US)

(72) Inventor: Gary Smith, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/293,800

(22) Filed: Oct. 14, 2016

(65) Prior Publication Data

US 2017/0030183 A1   Feb. 2, 2017

Related U.S. Application Data

(63) Continuation of application No. 14/721,644, filed on May 26, 2015, now Pat. No. 9,506,335.
(Continued)

(51) Int. Cl.
*E21B 4/16* (2006.01)
*E21B 44/00* (2006.01)
(Continued)

(52) U.S. Cl.
CPC ............. *E21B 44/005* (2013.01); *E21B 3/00* (2013.01); *E21B 7/04* (2013.01); *E21B 45/00* (2013.01);
(Continued)

(58) Field of Classification Search
CPC ............ E21B 7/068; E21B 7/067; E21B 4/16; E21B 7/002; E21B 7/04
See application file for complete search history.

(56) References Cited

U.S. PATENT DOCUMENTS 5,163,521 A  *  11/1992  Pustanyk ................. E21B 7/04
                                                        175/107
5,535,835 A       7/1996  Walker
(Continued)

FOREIGN PATENT DOCUMENTS

GB            2306528 A     5/1997

*Primary Examiner* — Kipp Wallace
(74) *Attorney, Agent, or Firm* — Keeling Law, LLC; Kenneth A. Keeling; Mark S. Solomon (57) ABSTRACT

Embodiments of a downhole drilling assembly generally include a rotatable lower drilling assembly, a rotatable upper drilling assembly, and a drill bit, wherein the upper drilling assembly contains a mud motor adapted for clockwise rotation of its stator and counter-clockwise rotation of its rotor, whereby the lower drilling assembly is rotatable in the opposite direction of the upper drilling assembly or maintainable in a non-rotating state. The apparatus further includes sensors adapted to continuously measure physical properties and/or drilling parameters and a mechanism for continuously transmitting information relating thereto to the surface.

Embodiments of a method for operating a downhole drilling assembly generally include continuously measuring physical properties and/or drilling parameters proximate the drill bit, continuously transmitting information relating thereto to the surface, and controlling rotation of a lower drilling assembly in a non-rotating state or in the opposite direction of an upper drilling assembly by varying drill string rotation.

20 Claims, 6 Drawing Sheets

Related U.S. Application Data (60) Provisional application No. 62/003,435, filed on May 27, 2014.

(51) Int. Cl.

| | | |
|---|---|---|
| *E21B 3/00* | (2006.01) | |
| *E21B 45/00* | (2006.01) | |
| *E21B 47/12* | (2012.01) | |
| *E21B 47/06* | (2012.01) | |
| *E21B 47/024* | (2006.01) | |
| *E21B 7/04* | (2006.01) | |
| *G05B 15/02* | (2006.01) | |
| *E21B 47/18* | (2012.01) | |
| *G05B 19/406* | (2006.01) | |

(52) U.S. Cl.
CPC ............ *E21B 47/024* (2013.01); *E21B 47/06* (2013.01); *E21B 47/122* (2013.01); *E21B 47/18* (2013.01); *G05B 15/02* (2013.01); *G05B 19/406* (2013.01); *G05B 2219/45129* (2013.01)

(56) References Cited

U.S. PATENT DOCUMENTS

| | | |
|---|---|---|
| 5,727,641 A | 3/1998 | Eddison et al. |
| 5,857,531 A | 1/1999 | Estep et al. |
| 7,946,361 B2 | 5/2011 | Gurjar et al. |
| 7,987,927 B2 | 8/2011 | Downton |
| 8,151,907 B2 | 4/2012 | MacDonald |
| 8,201,642 B2 | 6/2012 | Radford et al. |
| 8,381,839 B2 | 2/2013 | Rosenhauch |
| 8,567,528 B2 | 10/2013 | Comeau et al. |
| 8,881,846 B2 | 11/2014 | Sitka |
| 9,260,943 B2 | 2/2016 | Eriksson et al. |
| 2012/0018218 A1* | 1/2012 | Rosenhauch ............. E21B 4/02 175/24 |
| 2013/0240268 A1 | 9/2013 | Crowley et al. |
| 2014/0102792 A1 | 4/2014 | Lachner, Jr. et al. |
| 2015/0107901 A1* | 4/2015 | Eriksson ................. E21B 47/12 175/40 |
| 2015/0247397 A1 | 9/2015 | Samuel |
| 2016/0024848 A1 | 1/2016 | Desmette et al. |

\* cited by examiner

MULTI-DIRECTIONALLY ROTATING DOWNHOLE DRILLING ASSEMBLY AND METHOD

CROSS-REFERENCE TO RELATED APPLICATIONS

This application is a continuation of prior U.S. patent application Ser. No. 14/721,644, filed May 26, 2015, which claims the benefit of U.S. Provisional Application No. 62/003,435, filed May 27, 2014, which applications are both incorporated herein by reference as if reproduced in full below.

STATEMENT REGARDING FEDERALLY SPONSORED RESEARCH OR DEVELOPMENT

Not applicable.

FIELD OF THE DISCLOSURE

The present invention relates generally to a rotary steerable downhole drilling assembly to be utilized in the formation of a subsurface wellbore. The invention also relates to a method for forming a subsurface wellbore utilizing embodiments of this apparatus. The invention further relates to an apparatus and method for obtaining and transmitting to the surface certain downhole physical measurements and drilling parameters to assist in controlling downhole operations.

BACKGROUND

Wellbore formation typically entails use of a rotating drilling string, to the end of which is connected a rotating drilling device. Directional drilling, i.e, drilling on a curved path, is well known within the art. See, for example, U.S. Pat. No. 8,881,846 to Sitka; U.S. Pat. No. 8,567,528 to Comeau, et al.; U.S. Pat. No. 8,381,839 to Rosenhauch; U.S. Pat. No. 8,151,907 to McDonald; U.S. Pat. No. 7,946,361 to Gurjar, et al.; U.S. Pat. No. 5,857,531 to Estep, et al.; U.S. Pat. No. 5,535,835 to Walker; and U.S. Pat. No. 5,727,641 to Eddison, each of which is incorporated herein by reference in its entirety. Due to friction and other subsurface forces, operation of the drilling assembly results in a significant amount of torque being applied to the drill string. There is prior art wherein attempts have been made to address the torque problem. For example, U.S. Pat. No. 8,151,907 to McDonald discloses a method and system for forming a subsurface wellbore wherein a drill string rotates in one direction and near the end of the drill string an inverted motor rotates a bottom hole assembly in the opposite direction. U.S. Pat. No. 8,567,528 to Comeau, et al. discloses a method and system for forming a subsurface wellbore wherein a drill string rotates in one direction and near the end of the drill string a control assembly manipulates a poppet to maintain a bottom hole assembly in a rotationally stationary position. It would be advantageous to have a device and method that better compensate for drill string torque and improve directional control of the drilling assembly.

BRIEF SUMMARY OF THE INVENTION

Embodiments of the present invention generally comprise an apparatus and method wherein a downhole drilling assembly, also referred to as a bottom hole assembly ("BHA"), includes a means of controlling the rotation of a plurality of directional drilling motors. More specifically, embodiments of the present invention allow for rotation of a portion of the downhole drilling assembly, proximate the drilling device, in the same direction that the drill string rotates or in the direction opposite to that which the drill string rotates; and also allows for zero rotation, wherein that portion of the downhole drilling assembly proximate the drilling device does not rotate. Embodiments of the present invention allow for substantially continuous rotational control of the downhole drilling assembly, proximate the drilling device, which can thereby be rotated in either direction, over a range of rotational velocities, or maintained in a non-rotating, or "geo-stable," position. Embodiments of the present invention further comprise a sensor assembly and method for obtaining physical measurements and/or evaluating drilling parameters proximate the drilling device on a substantially continuous basis and transmitting data containing and/or derived from the physical measurements and/or drilling parameters to the surface, where it can be received, processed, and used to control the downhole drilling assembly of the present invention. Additional embodiments of the invention include a power production component and/or power storage component of the downhole drilling assembly.

BRIEF DESCRIPTION OF THE DRAWINGS

For a more complete understanding of the exemplary embodiments, reference is now made to the following Detailed Description of Exemplary Embodiments of the Invention, taken in conjunction with the accompanying drawings, in which.

DETAILED DESCRIPTION OF EXEMPLARY EMBODIMENTS OF THE INVENTION

The exemplary embodiments are best understood by referring to the drawings, like numerals and letters being used for like and corresponding parts or features of the various drawings. The directions lower and upper as used in this specification are used for descriptive purposes only and it will be understood by one having skill in the art that different orientations are possible.

Figure 1:
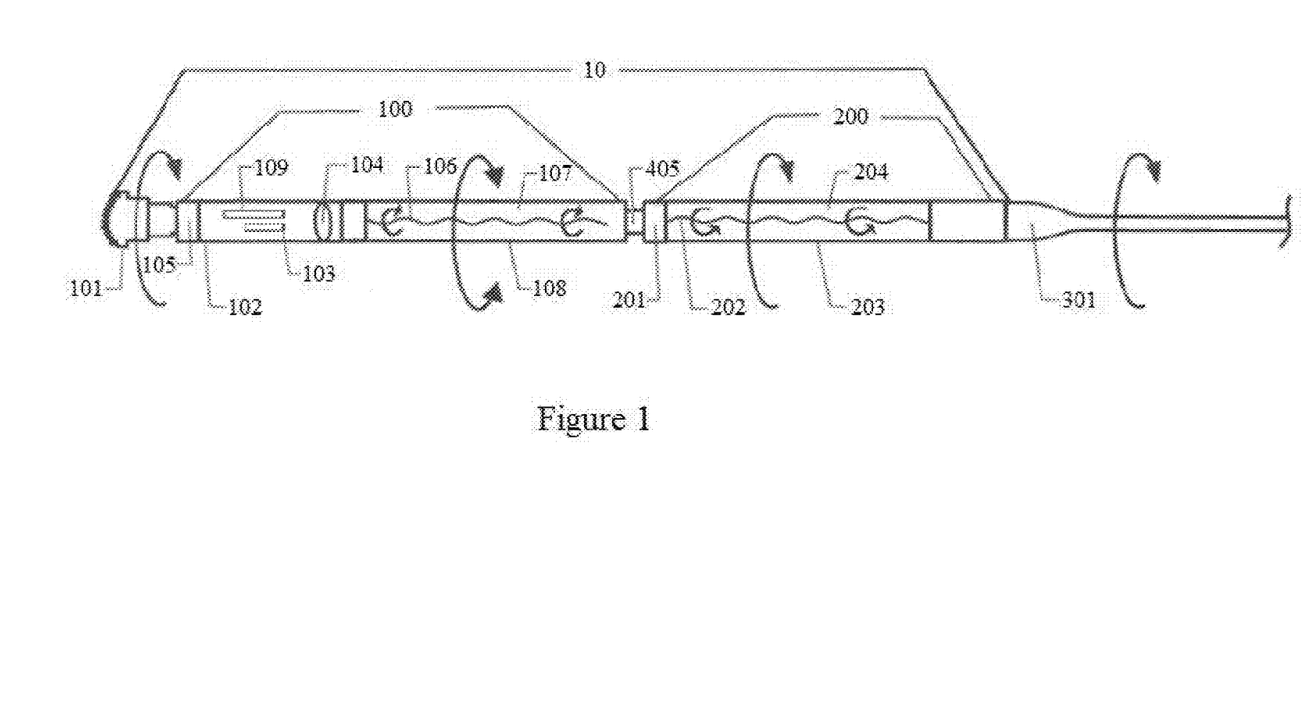
FIG. 1 depicts an embodiment of the downhole drilling assembly of the present invention.
Figure 2:
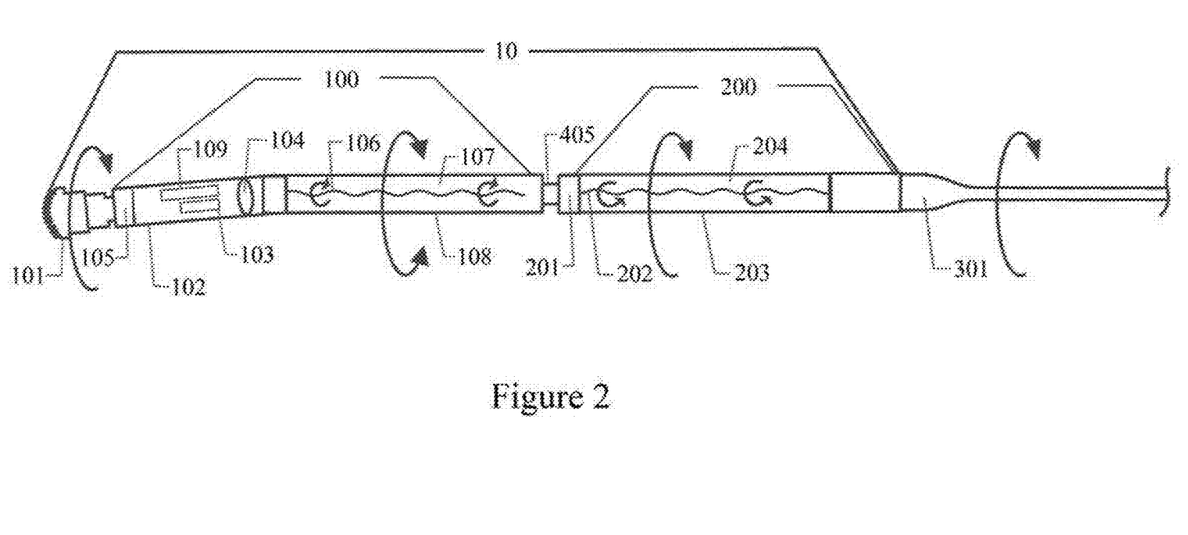
FIG. 2 depicts an embodiment of the downhole drilling assembly of the present invention.

Referring to the embodiments depicted in FIGS. 1 and 2, downhole drilling assembly 10 comprises rotatable lower drilling assembly ("LDA") 100, rotatable upper drilling assembly ("UDA") 200, and a drilling device 101, such as a drill bit. Upper drilling assembly 200 is connected to a drill string 301. Lower drilling assembly 100 is connected to drill bit 101.

As known in the art, drill bit 101 may comprise any drill bit useful in a particular downhole drilling environment. In one embodiment, drill bit 101 is a conventional fixed cutter bit, such as but not limited to, a polycrystalline diamond compact (PDC), grit hot-pressed insert (GHI), or natural diamond mud drill bit. In another embodiment, drill bit 101 is a conventional roller cone bit, such as but not limited to, a tungsten carbide insert (TCI) or milled tooth (MT) drill bit.

Disposed within lower drilling assembly 100 is at least one drilling sensor assembly 103. In an embodiment of the present invention, drilling sensor assembly 103 is disposed proximate drill bit 101. In one embodiment, drilling sensor assembly 103 is disposed proximate a first motor 108 and above a bearing assembly 105. In one embodiment, drilling sensor assembly 103 is disposed radially over a drive shaft (not shown) which connects rotor 106 to bearing assembly 105. In one embodiment, sensor assembly 103 is disposed in a pressure sealed housing (not shown) along with other components such as one or more optional batteries 109 and/or additional control electronics (not shown). Although drilling sensor assembly 103 and batteries 109 are depicted in FIGS. 1-3 in a substantially parallel arrangement, the invention is not so limited and other orientations may be employed.

Drilling sensor assembly 103 includes devices (not shown), such as sensors, utilized in measurement while drilling (MWD), and/or logging while drilling (LWD), and adapted to obtain information related to physical properties and/or drilling parameters/conditions such as, but not limited to, gamma rays, inclination, azimuth, pressure, strain, vibration, stick-slip, tool face orientation/alignment, resistivity, density, seismology, neutron porosity, borehole diameter (caliper), nuclear magnetic resonance. In one embodiment sensor assembly 103 includes at least one of a total gamma ray sensor, a spectral gamma ray sensor, an inclination sensor, an azimuthal gamma ray sensor, a pressure sensor, a strain sensor, a resistance sensor, a density sensor, a neutron porosity sensor, and a tool face orientation/alignment sensor. In one embodiment, orientation/alignment is determined by accelerometers measuring in 3 orthogonal directions, and one or more magnetometers. In one embodiment, pressure and/or strain gauges measure parameters such as weight on bit (WOB), torque, and bending.

In one embodiment, lower drilling assembly 100 also comprises a sensor transmission unit 104. Sensor transmission unit 104 is adapted to transmit information obtained by one or more of the sensors on a substantially continuous basis to a remote location, such as logic assembly 405. Sensor information may be transmitted to logic assembly 405 wirelessly and/or via wires. In one embodiment, sensor information is transmitted to logic assembly 405 via a cable (not shown) mounted in a longitudinal groove (not shown) along first motor 108 and is protected from the drilling environment with a thick sleeve (not shown) that is slid over the groove and is rotationally and longitudinally held in place. In one embodiment, pressure connectors (not shown) are disposed on both ends of the cable that allow cable wires to communicate sensor information while excluding contaminants. In one embodiment, sensor assembly 103 may include an antenna (not shown) to facilitate wireless transmission/reception, such as transmission of sensor information to logic assembly 405. Sensor transmission unit 104 may be adapted to transmit commands received, wirelessly and/or via wires, from a remote location, such as logic assembly 405, to one or more sensors.

Figure 3:
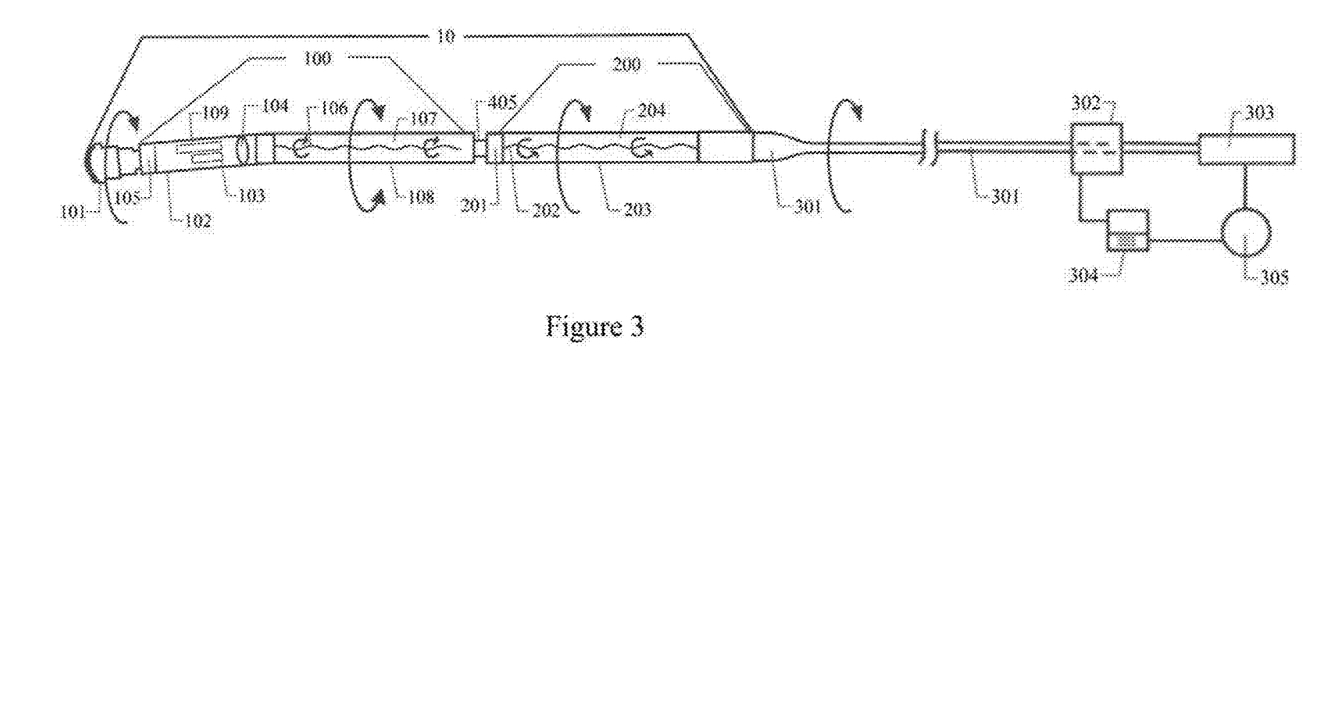
FIG. 3 depicts an embodiment of the downhole drilling assembly of the present invention as well as embodiments of various additional components.

In an embodiment of the invention depicted in FIG. 3, sensor transmission unit 104 transmits information to a logic assembly 405 disposed intermediate first motor 108 and a second motor 203. In one embodiment, logic assembly 405 is adapted to receive the sensor information, convert the information into another form, if necessary, and transmit the information, directly or indirectly, to a processing device 302 located at or near the surface of the well, via a method such as mud pulse telemetry. In one embodiment, processing device 302 comprises an MWD receiver/decoder which may utilize a pressure transducer (not shown). As will be further described, processing device 302 may be adapted to provide information that may be utilized to control various aspects of the drilling operation, including but not limited to, drilling direction, drilling force (WOB), mud flow rate, and rate of rotation of drill string 301.

Figure 5:
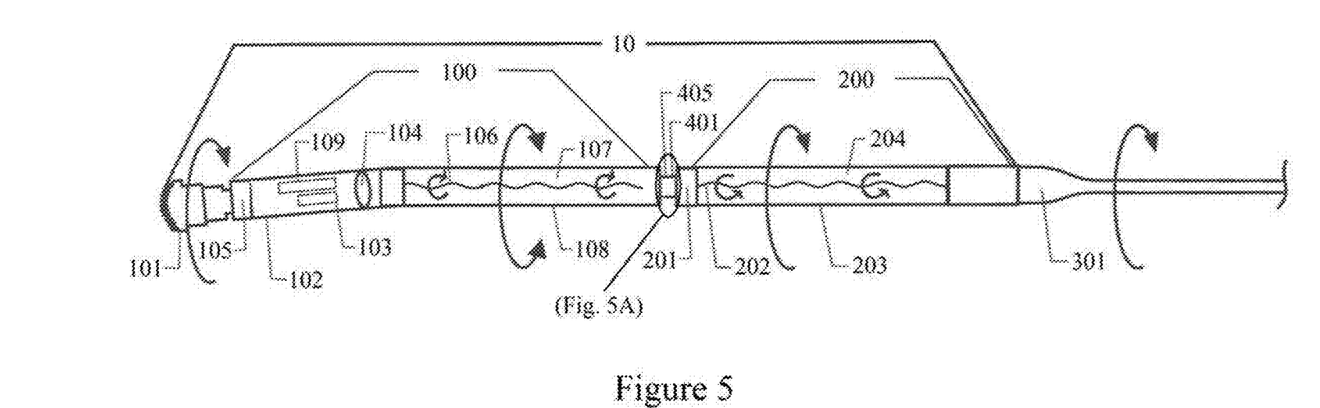
FIG. 5 depicts an embodiment of a downhole drilling assembly of the present invention.
Figure 5A:
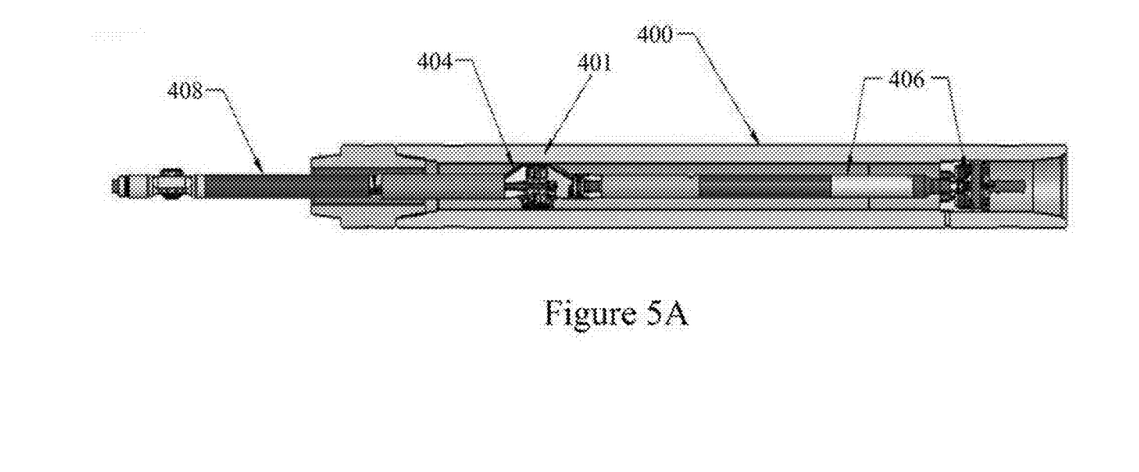
FIG. 5A depicts an expanded view of the embodiment of FIG. 5.

In one embodiment, as depicted in FIGS. 5 and 5A, downhole drilling assembly 10 comprises a power generation system 401 intermediate first motor 108 and second motor 203. In one embodiment, optional power generation system 401 and/or batteries 109 are utilized to provide electrical power to one or more sensors, sensor transmission unit 104, logic assembly 405, an electronic module 408, a pulser 406, and/or one or more additional control electronics (not shown). In one embodiment, batteries 109 provide an electrical power backup in the event of failure of power generation system 401. In one embodiment, batteries 109 may comprise rechargeable batteries which can be recharged by power generation system 401. Wires (not shown) electrically connect power generation system 401 and/or batteries 109, directly or indirectly, to the components that operate via electrical power.

As shown in detail in the embodiment depicted by FIG. 5A, power generation system 401 is disposed within a collar 400. In one embodiment, power generation system 401 comprises a fluid driven turbine 402 comprising an alternator 404 adapted to convert fluid flow energy into electrical energy. In one embodiment, batteries 109 may be disposed within collar 400.

As also shown in greater detail in the embodiment of FIG. 5A, logic assembly 405 may comprise a device 406, such as but not limited to an MWD pulse generator ("pulser"), adapted to transmit information to processing device 302 via a method such as mud pulse telemetry (MPT), a binary coding transmission system used with fluids. In the embodiment shown in FIG. 5A, logic assembly 405 also comprises electronic module 408. Although the embodiment of FIG. 5A depicts pulser 406 and electronic module 408 as being linearly aligned on opposites sides of power generation system 401, the invention is not so limited and other arrangements may be employed, as would be understood by one skilled in the art. Electronic module 408 is communicatively connected, directly or indirectly, via wires and/or wirelessly, with pulser 406. In one embodiment, electronic module 408 may include an antenna (not shown) to facilitate wireless transmission/reception, such as transmission of information to pulser 406.

Electronic module 408 is communicatively connected, directly or indirectly, with the one or more sensors, via wires and/or wirelessly. In one embodiment, electronic module 408 receives sensor information from sensor transmission unit 104. Electronic module 408 may also store the received sensor information. In one embodiment, electronic module 408 is adapted to query one or more sensors, directly or indirectly, for information.

In operation, electronic module 408 comprises one or more individual components (not shown) that are adapted to perform various functions, including but not limited to, one or more of the following aspects of the invention. In various aspects, electronic module 408 provides for reception of sensor information obtained from one or more sensors, storage of that information, calculations based on that information, and storage of such calculations. In another aspect, electronic module 408 provides for transmission of commands to one or more sensors, such as commands comprising but not limited to, requests/instructions for one or more measurements to be obtained by a sensor. In other aspects, electronic module 408 provides for transmission of information to pulser 406 and commands related to operation of pulser 406. In additional aspects, electronic module 408 provides for detection of a failure of power generation system 401, and for switching between electronic component operation via power generation system 401 provided electrical energy or battery power.

In the embodiment of the invention depicted in FIG. 3, processing device 302 receives information from pulser 406 and transmits the information to a computing device 304 adapted to compile, process, analyze, or otherwise manipulate the information. In one embodiment, control information is then transmitted from computing device 304 to a control device 305 that may comprise an automatic driller unit adapted to determine drilling parameters. In one embodiment, the drilling parameter information determined by control device 305 is transmitted to a component 303, such as rig top drive unit, that is adapted to control and adjust rotation of drill string 301. The drilling parameter information may also be used to adjust and/or control additional operational drilling parameters, such as mud flow rate and WOB. In one embodiment of the present invention, due to the substantially continuous transmission of downhole information to the surface, no down links or shut downs are required to control downhole drilling assembly 10 via control device 305.

Disposed within lower drilling assembly 100 is a first motor 108 adapted to provide operational force to drill bit 101. First motor 108 is operationally connected to drill bit 101. In one embodiment, first motor 108 is a conventional mud motor as generally known to and understood by those skilled in the art. In one embodiment, first motor 108 comprises a bent sub or bent housing steerable motor. In the embodiment of the invention depicted in FIGS. 2 and 3, lower drilling assembly 100 comprises a bent sub housing 102.

First motor 108 includes stator 107 and rotor 106. First motor rotor 106 is operationally connected to drill bit 101. First motor stator 107 is connected to a first motor housing (not shown). In one embodiment, lower drilling assembly 100 also comprises a bearing assembly 105 that comprises radial and thrust bearings to stabilize a first motor shaft (not shown). In one embodiment, first motor rotor 106 is operationally connected to drill bit 101 via bearing assembly 105.

A second motor 203 is disposed within upper drilling assembly 200 and is operationally connected to lower drilling assembly 100. In one embodiment, second motor 203 is a mud motor, configured however, to provide rotor rotation in a direction opposite that of first motor 108. Second motor 203 includes stator 204 and rotor 202. Second motor stator 204 is connected to a second motor housing (not shown). Second motor 203 is adapted to provide rotational force in a direction opposite that of drill string 301. In one embodiment, second motor rotor 202 is connected to lower drilling assembly 100. More specifically, second motor rotor 202 is connected to first motor stator 107. In one embodiment, upper drilling assembly 200 comprises a bearing assembly 201 that comprises both radial and thrust bearings to stabilize a second motor shaft (not shown). In one embodiment, second motor rotor 202 is operationally connected to first motor stator 107 via bearing assembly 201.

Figure 4:
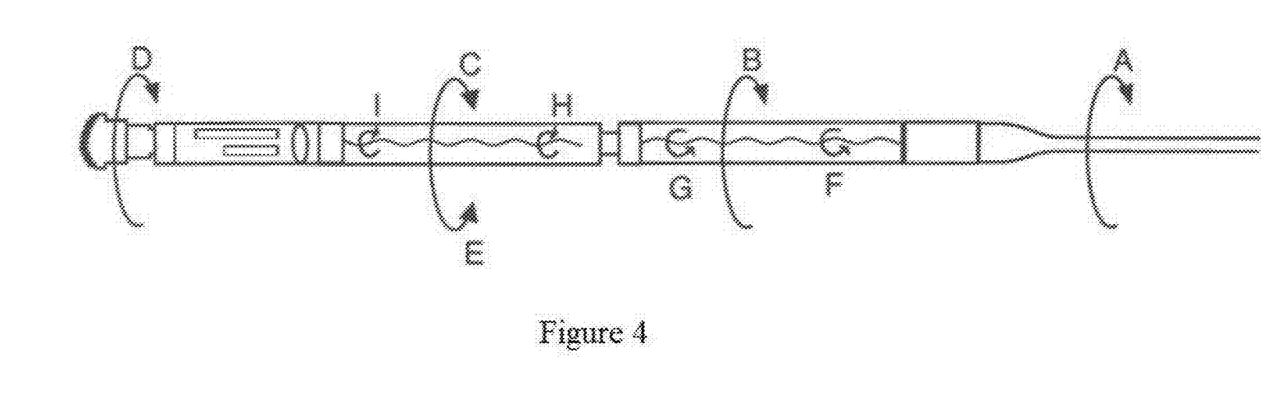
FIG. 4 depicts the rotational direction(s) of various parts of an embodiment of the downhole assembly of the present invention.

In an embodiment of the invention depicted in FIG. 4, in which components comparable to those specifically identified in FIGS. 1-3 are un-labeled to provide clarity, rotational force in the direction of rotation of drill string 301 (as depicted by arrow "A") is provided to upper drilling assembly 200 by rotation of drill string 301 (as depicted by arrow "B"). Rotation of drill string 301 is provided at the well surface by rotation of a top drive (not shown) included in rig top drive unit 303 connected to drill string 301. Fluid flow through second motor 203 rotates second motor rotor 202 in the opposite direction (as depicted by arrows "F" and "G"). Fluid flow through first motor 108 turns first motor rotor 106 in the first direction, as depicted by arrows "H" and "I." First motor rotor 106 and second motor rotor 202 are thus both operating, but are rotating in opposite directions, as depicted by arrows "H" and "G." First motor 108 provides rotational force to drill bit 101 in the same direction of rotation (as depicted by arrow "D"). As would be understood by one skilled in the art, in one aspect, rotation of upper drilling assembly 200 provides rotational force to lower drilling assembly 100 (as depicted by arrow segment "C") via frictional force between contacting surfaces (not shown) of upper drilling assembly 200 (or components connected thereto) and lower drilling assembly 100 (or components connected thereto).

Under operating conditions of an embodiment of the present invention, lower drilling assembly 100 is therefore provided rotational force from two oppositely rotating sources. That is, rotational force in a first direction is provided from the rotation of upper drilling assembly 200 by drill string 301, and rotational force in the opposite direction is provided from fluid flow by second motor rotor 202. Due to the application of opposing forces, rotation, if any, of lower drilling assembly 100, is determined by the net effect of these opposing rotational forces. In one aspect, when the force provided from the rotation of upper drilling assembly 200 to lower drilling assembly 100 equals the force provided to lower drilling assembly 100 by second motor rotor 202, lower drilling assembly 100 ceases to rotate. When the force provided to lower drilling assembly 100 by the rotation of upper drilling assembly 200 is greater than the rotational force provided to lower drilling assembly 100 by second motor rotor 202, lower drilling assembly 100 rotates in the first direction (as depicted by arrow segment "C" in FIG. 4). When the force provided to lower drilling assembly 100 from the rotation of upper drilling assembly 200 is less than the rotational force provided to lower drilling assembly 100 by second motor rotor 202, lower drilling assembly 100 rotates in the opposite direction, as depicted by arrow segment "E" in FIG. 4. In this embodiment, rotational control of lower drilling assembly 100 is obtained by proportioning the magnitude of the forces provided to lower drilling assembly 100 by the rotation of upper drilling assembly 200 (from rotation of drill string 301) and second motor 203 (from mud flow). In one aspect wherein fluid flow rate down hole is held constant, simply rotating drill string 301 at different speeds will allow for complete rotational control of downhole assembly 10. In such event, the rotation, if any, of lower drilling assembly 100 may be thus determined and adjusted at the surface of the wellbore via rig top drive unit 303.

As one skilled the art would understand, rotation of drill string 301 (as depicted by arrow "A" in FIG. 4) is typically designated as "clockwise" rotation. Accordingly, rotation in the opposite direction is designated as "counter-clockwise."

One purpose of the design of the left-handed, counter-clockwise rotational motor of embodiments of the present invention is to allow for, among other things, continuous high speed drilling in the "slide" (non-rotating) mode while rotating drill string 301.

To further explain the function of second motor 203, second motor 203 comprises a rotor 202 and stator 204 designed to rotate rotor 202 in a counter-clockwise direction. In an embodiment where second motor 203 is a conventional mud motor, the rotation speed of second motor rotor 202 is a function of fluid flow rate. In one example, the fluid flow rate is approximately, but not limited to, 250 gpm. In one embodiment, motor 203 is adapted to be a very slow speed, extremely high torque motor. In one example, the rotational speed of second motor rotor 202 may be, but is not limited to, 80 rpm rotating in a counter-clockwise direction.

Lower drilling assembly 100 contains first motor 108, which comprises rotor 106 and stator 107. In an embodiment where first motor 108 is a conventional mud motor, it is adapted to accommodate the same exemplary 250 gpm flow rate. In one example, first motor 108 may be designed to rotate rotor 106 in a clockwise direction at, but not limited to, 180 rpm. First motor rotor 106 is operationally connected to drill bit 101.

To continue this non-limiting example, with second motor rotor 202 rotating in a counter-clockwise direction at 80 rpm, first motor stator 107 experiences this counter-clockwise rotational force. To counteract this rotational force, drill string 301 must rotate continuously at 80 rpm clockwise to neutralize the rotational force provided from second motor 203. With drill string 301 rotating at 80 rpm clockwise, lower drilling assembly 100 is not rotating, i.e., has become geo-stable. This is the same rotational disposition as used in the drilling term slide. Still referring to this example, first motor rotor 106 is continuously rotating clockwise at 180 rpm, but the lower drilling assembly 100 is not rotating. To force the lower drilling assembly 100 into a clockwise rotation mode, the rotation speed of drill string 301 is simply increased. This additional rotation above 80 rpm will rotate the entire downhole drilling assembly 10 in a clockwise direction. The drill bit 101 will rotate at 180 rpm plus the additional drill string rotations required to rotate downhole drilling assembly 10. The additional rotations may be about, but is not limited to, 5 rpm. To force the lower drilling assembly 100 into a counter-clockwise rotation mode, the rotation speed of drill string 301 is simply decreased. This reduction in rotation below 80 rpm will result in rotation of lower drilling assembly 100 in a counter-clockwise direction, while upper drilling assembly 200 continues to rotate in a clockwise direction. The drill bit 101 will rotate at 180 rpm minus the reduced rotation rate below the exemplary 80 rpm. The reduction in rotations may be about, but is not limited to, 5 rpm.

Controlling rotation of downhole drilling assembly 10 while maintaining constant flow rate of the drilling mud allows for control of the entire downhole drilling assembly 10 by merely altering rotational speed of drill string 301.

Method

In one embodiment of the present invention, downhole drilling assembly 10 is attached to the end of drill string 301 and lowered into the wellbore (not shown). Mud flow and rotational force are supplied thereto to commence rotation of the upper drilling assembly 200 and lower drilling assembly 100. In one embodiment, sensor information is transmitted from sensor transmission unit 104 to electronic module 408; from electronic module 408 to pulser 406; and from pulser 406 to the surface, each of which transmissions may be carried out on a substantially continuous basis. The information received at the surface is utilized, as received or as subsequently processed, compiled, analyzed, and/or otherwise manipulated, to determine desired operating and drilling parameters. If warranted, the ratio of forces (drill string 301 rotation and mud flow rate) applied to the upper drilling assembly 200 and lower drilling assembly 100 may be changed to control downhole drilling assembly 10. In one embodiment, this ratio of forces is varied by changing the drill string 301 rotation rate only.

Figure 6:
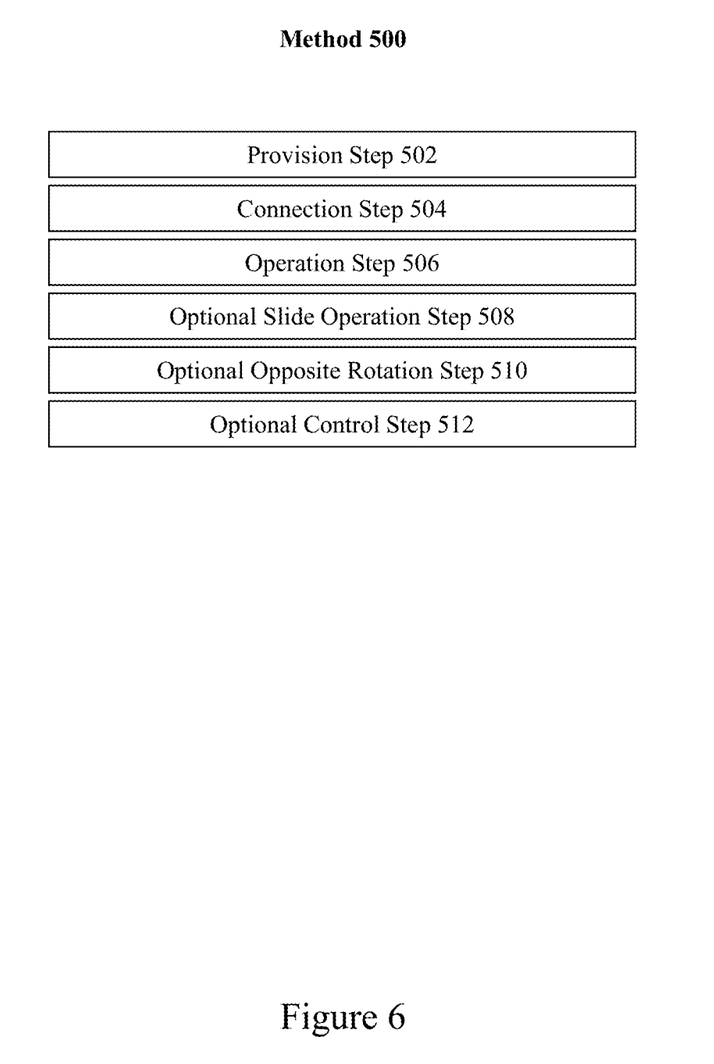
FIG. 6 depicts an embodiment of a method of the present invention.

An exemplary method 500 of the present invention comprises the following steps:

Provision Step 502—Providing a downhole drilling assembly, such as downhole drilling assembly 10, comprising a lower drilling assembly, such as lower drilling assembly 100, an upper drilling assembly, such as upper drilling assembly 200, and a drill bit, such as drill bit 101.

Connection Step 504—Connecting a stator of a motor of the upper drilling assembly, such as stator 204, to the end of a drill string, such as drill string 301.

Operation Step 506—Operating the downhole drilling assembly 10 down hole, whereby:

rotation of the drill string 301 in a clockwise direction results in rotation of a stator of a motor of the upper drilling assembly, such as stator 204, in a clockwise direction;

flow of mud down hole results in rotation of a rotor of the motor of the upper drilling assembly, such as rotor 202, in a counter-clockwise direction;

flow of mud down hole results in rotation of a rotor of a motor of the lower drilling assembly, such as rotor 106, in a clockwise direction;

rotation of rotor 106 in a clockwise direction results in, via a bearing assembly of the lower drilling assembly, such as bearing assembly 105, rotation of drill bit 101 in a clockwise direction;

rotation of stator 204 in a clockwise direction results in a clockwise rotational force being applied, via frictional force, to a stator of the motor of the lower drilling assembly, such as stator 107; and rotation of rotor 202 in a counter-clockwise direction results in, via attachment thereof to stator 107, via a bearing assembly of the upper drilling assembly, such as bearing assembly 201, a counter-clockwise rotational force being applied to stator 107.

Optional Slide Operation Step 508—Continuously or intermittently rotating the drill string 301 at a rate and flowing mud down hole at a rate whereby the clockwise force applied to stator 107 and the counter-clockwise force applied to stator 107 are equal, and thereby downhole assembly 100 does not rotate.

Optional Opposite Rotation Operation Step 510—Continuously or intermittently rotating the drill string 301 at a rate and flowing mud down hole at a rate whereby the clockwise force applied to stator 107 is less than the counter-clockwise force applied to stator 107, and thereby downhole assembly 100 rotates in a counter-clockwise direction.

Optional Control Operation Step 512—Continuously or intermittently controlling the downhole drilling assembly 10 utilizing information obtained, continuously or intermittently, from sensors in a drilling sensor assembly, such as drilling sensor assembly 103, and transmitted continuously or intermittently, to a processing device, such as processing device 302, located at or near the surface of the well, whereby controlling the downhole drilling assembly 10 consists of adjusting drilling parameters at the surface of the well without having to send any signals down hole.

Method 500 is merely exemplary, and additional embodiments of a method of utilizing a downhole drilling assembly of the present invention consistent with the teachings herein may be employed.

While the preferred embodiments of the invention have been described and illustrated, modifications thereof can be made by one skilled in the art without departing from the teachings of the invention. Descriptions of embodiments are exemplary and not limiting. The extent and scope of the invention is set forth in the appended claims and is intended to extend to equivalents thereof. The claims are incorporated into the specification. Disclosure of existing patents, publications, and known art are incorporated herein by reference to the extent required to provide details and understanding of the disclosure herein set forth.

I claim:

1. A downhole drilling assembly for use in a subsurface wellbore, comprising:
　a rotatable lower drilling assembly;
　a rotatable upper drilling assembly; and
　a drill bit; wherein:
　　said lower drilling assembly comprises:
　　　a first motor adapted to provide rotational force to said drill bit in a first direction; and
　　　a sensor assembly comprising one or more sensors; and
　　said upper drilling assembly comprises:
　　　a second motor adapted to provide rotational force to said lower drilling assembly in a second direction via rotation of a rotor of said second motor which is coupled to a stator of said first motor via a bearing, wherein said first direction is opposite said second direction; wherein:
　　said upper drilling assembly is adapted to be rotated in said first direction by a drill string rotating in said first direction via a stator of said second motor coupled to said drill string, and provide rotational force directed in said first direction to said lower drilling assembly via frictional forces that are transmitted to said stator of said first motor; and
　　said lower drilling assembly is adapted to be rotated, by said rotational force directed in said first direction and said rotational force directed in said second direction, in each of one or more rotation modes selected from the group consisting of:
　　　rotating in said first direction;
　　　rotating in said second direction; and
　　　not rotating.

2. The downhole drilling assembly of claim 1, wherein said sensor assembly comprises at least one sensor selected from the group consisting of:
　a total gamma ray sensor;
　a spectral gamma ray sensor
　an inclination sensor;
　an azimuthal gamma sensor;
　a pressure sensor;
　a strain sensor;
　a resistance sensor
　a density sensor
　a neutron porosity sensor
　an accelerometer;
　a magnetometer; and
　a tool face orientation/alignment sensor.

3. The downhole drilling assembly of claim 1, wherein said lower drilling assembly is adapted to be rotated in each of said one or more rotation modes by varying the rotation speed of a rotating drill string attached to said upper drilling assembly.

4. The downhole drilling assembly of claim 1, wherein at least one of said first motor and said second motor is a motor actuated by fluid flow there through.

5. The downhole drilling assembly of claim 1, comprising:
　a power generation system.

6. The downhole drilling assembly of claim 5, comprising:
　one or more rechargeable batteries, wherein:
　　said power generation system is adapted and configured to recharge at least one of said one or more rechargeable batteries.

7. The downhole drilling assembly of claim 1, comprising:
　a sensor information transmission device adapted and configured to transmit information obtained by at least one of said one or more sensors to a remote location.

8. A downhole drilling assembly for use in a subsurface wellbore, comprising:
　a rotatable lower drilling assembly;
　a rotatable upper drilling assembly;
　a drill bit; and
　a logic assembly; wherein:
　　said lower drilling assembly comprises:
　　　a first motor adapted to provide rotational force to said drill bit in a first direction;
　　　a sensor assembly comprising one or more sensors; and
　　　a sensor information transmission device; and
　　said upper drilling assembly comprises:
　　　a second motor adapted to provide rotational force to said lower drilling assembly in a second direction via rotation of a rotor of said second motor which is coupled to a stator of said first motor via a bearing, wherein said first direction is opposite said second direction; wherein
　　said logic assembly is adapted to receive information from said sensor information transmission device and transmit information to a location proximate the surface of said wellbore;
　　said upper drilling assembly is adapted to be rotated in said first direction by a drill string rotating in said first direction via a stator of said second motor coupled to said drill string, and provide rotational force directed in said first direction to said lower drilling assembly via frictional forces that are transmitted to said stator of said first motor; and
　　said lower drilling assembly is adapted to be rotated, by said rotational force directed in said first direction and said rotational force directed in said second direction, in each of one or more rotation modes selected from the group consisting of:
　　　rotating in said first direction;
　　　rotating in said second direction; and
　　　not rotating.

9. The downhole drilling assembly of claim 8, wherein said logic assembly is at least partially disposed intermediate said lower drilling assembly and said upper drilling assembly.

10. The downhole drilling assembly of claim 8, wherein said logic assembly comprises:
a pulse generator; and
an electronic module adapted to:
receive information from said sensor information transmission device;
transmit commands, directly or indirectly, to one or more of said one or more sensors; and
transmit information to said pulse generator.

11. The downhole drilling assembly of claim 10, wherein at least one of said sensor information transmission device and said electronic module is adapted to provide information transmission wirelessly.

12. The downhole drilling assembly of claim 10, wherein said electronic module is adapted to perform at least one function selected from the group consisting of:
reception of information from said sensor information transmission device;
storage of said information;
calculation of data from said information;
storage of said data;
transmission of sensor commands;
transmission of information to said pulse generator;
detection of a failure of a power generation system of said downhole drilling assembly; and
alternation between utilization of electrical power produced by said power generation system and utilization of electrical power provided by one or more batteries disposed in said downhole drilling assembly.

13. The downhole drilling assembly of claim 8, wherein said sensor assembly comprises at least one sensor selected from the group consisting of:
a total gamma ray sensor;
a spectral gamma ray sensor
an inclination sensor;
an azimuthal gamma sensor;
a pressure sensor;
a strain sensor;
a resistance sensor
a density sensor
a neutron porosity sensor
an accelerometer;
a magnetometer; and
a tool face orientation/alignment sensor.

14. The downhole drilling assembly of claim 8, wherein said lower drilling assembly is adapted to be rotated in each of said one or more rotation modes by varying the rotation speed of a rotating drill string attached to said upper drilling assembly.

15. A method for controlling a downhole drilling assembly for use in a subsurface wellbore, comprising:
adjusting the rotation speed of a drill string to vary the rotation rate or direction of a component of said downhole drilling assembly; wherein said drilling assembly comprises:
a rotatable lower drilling assembly;
a rotatable upper drilling assembly;
a drill bit; and
a logic assembly; wherein;
said lower drilling assembly comprises:
a first motor adapted to provide rotational force to said drill bit in a first direction;
a sensor assembly comprising one or more sensors; and
a sensor information transmission device; and
said upper drilling assembly comprises:
a second motor adapted to provide rotational force to said lower drilling assembly in a second direction via rotation of a rotor of said second motor which is coupled to a stator of said first motor via a bearing, wherein said first direction is opposite said second direction; wherein
said logic assembly is adapted to receive information from said information transmission device and transmit information to a location proximate the surface of said wellbore;
said upper drilling assembly is adapted to be rotated in said first direction by a drill string rotating in said first direction via a stator of said second motor coupled to said drill string, and provide rotational force directed in said first direction to said lower drilling assembly via frictional forces that are transmitted to said stator of said first motor; and
said lower drilling assembly is adapted to be rotated, by said rotational force directed in said first direction and said rotational force directed in said second direction, in each of one or more rotation modes selected from the group consisting of:
rotating in said first direction;
rotating in said second direction; and
not rotating.

16. The method of claim 15, wherein said adjusting the rotation speed of said drill string is based, at least in part, on information obtained by at least one of said one or more sensors.

17. The method of claim 15, comprising transmitting information from said sensor information transmission device to said logic assembly, and transmitting information from said logic assembly to a processing device disposed proximate the surface of said wellbore.

18. The method of claim 17, wherein:
said logic assembly comprises:
a pulse generator; and
an electronic module adapted to:
receive information from said sensor information transmission device;
transmit commands, directly or indirectly, to one or more of said one or more sensors; and
transmit information to said pulse generator; and
said transmitting information from said logic assembly to said processing device disposed proximate the surface of said wellbore comprises:
transmitting information from said electronic module to said pulse generator; and
transmitting information from said pulse generator to said processing device.

19. The method of claim 18, wherein:
at least one of said transmitting information from said sensor information transmission device to said logic assembly and transmitting information from said electronic module to said pulse generator comprises transmitting wirelessly.

20. The method of claim 17, wherein:
said adjusting the rotation speed of said drill string provides for alternation between at least one rotation mode combination selected from the group consisting of:
rotating in said first direction and not rotating; and
rotating in said second direction and not rotating.

* * * * *